United States Patent
Matkovich

(10) Patent No.: US 6,439,366 B1
(45) Date of Patent: Aug. 27, 2002

(54) ARTICLE SEPARATING METHOD AND APPARATUS

(75) Inventor: Mario Matkovich, Victoria (AU)

(73) Assignee: Rosebay Terrace Pty Ltd., Springvale (AU)

(*) Notice: Subject to any disclaimer, the term of this patent is extended or adjusted under 35 U.S.C. 154(b) by 0 days.

(21) Appl. No.: 09/720,574
(22) PCT Filed: Jun. 24, 1999
(86) PCT No.: PCT/AU99/00515
§ 371 (c)(1),
(2), (4) Date: Mar. 5, 2001
(87) PCT Pub. No.: WO99/67032
PCT Pub. Date: Dec. 29, 1999

(30) Foreign Application Priority Data

Jun. 24, 1998 (AU) .............................. PP4275

(51) Int. Cl.⁷ .............................. B65G 37/00
(52) U.S. Cl. .................. 198/360; 198/463.6; 198/464.4
(58) Field of Search .............................. 198/360, 463.6, 198/464.4, 953

(56) References Cited

U.S. PATENT DOCUMENTS

| | | | | |
|---|---|---|---|---|
| 4,276,995 A | * | 7/1981 | Jennewein | 198/463.6 |
| 4,792,035 A | * | 12/1988 | Turner et al. | 198/463.4 |
| 4,875,416 A | * | 10/1989 | Duce | 104/167 |
| 5,048,695 A | * | 9/1991 | Fuller et al. | 193/31 R |
| 5,072,822 A | * | 12/1991 | Smith | 198/349 |
| 5,238,116 A | * | 8/1993 | Santicchi | 198/463.6 |
| 5,657,851 A | * | 8/1997 | Speckhart et al. | 198/465.4 |

* cited by examiner

Primary Examiner—Christopher P. Ellis
Assistant Examiner—Joe Dillon, Jr.
(74) Attorney, Agent, or Firm—Amster, Rothstein & Ebenstein

(57) ABSTRACT

The present invention provides an apparatus (10) for separating a jumbled collection of articles, such as clothing or garment hangers (23), into a plurality of separate and discrete hangers. The apparatus includes conveyor means (12, 26, 32) adapted to transport a plurality of hangers (23) in succession along a process path; separation means, such as barrier gate members (20, 21), adapted to permit the hangers to proceed along the process path one at a time, sensing means (19, 38) adapted to detect when a hanger is entangled or interconnected with one or more other hangers; and removal means (30) adapted to remove any such entangled or interconnected hangers from the process path. The invention also provides a method for separating the hangers (23).

14 Claims, 4 Drawing Sheets

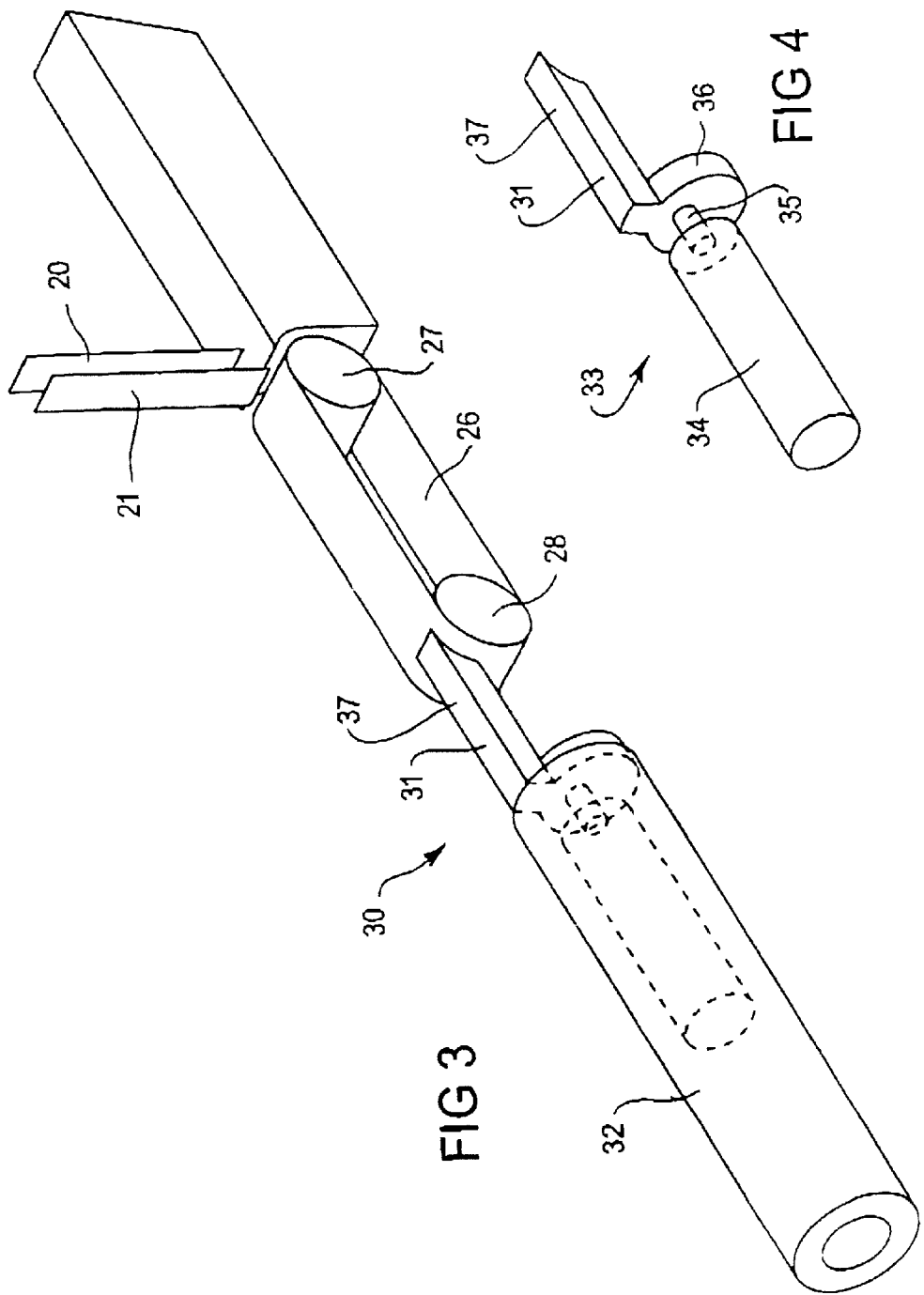

ARTICLE SEPARATING METHOD AND APPARATUS

TECHNICAL FIELD

The present invention relates to a method and apparatus for separating a jumbled collection of articles into a plurality of separate and discrete articles.

The invention has particular application to the separation of a collection of garment or clothing hangers in a recycling installation for used hangers. In such an installation the hangers are to be separated prior to being sorted into groups or categories according to the particular hanger style or type. The invention is herein described in this exemplary context. It is to be appreciated however that the method and apparatus of the invention are not limited to this particular application but are suitable for use in separating a variety of different articles.

BACKGROUND

For many years clothes hangers used in the retail clothing industry have largely been disposable. That is, the hangers have been used to hang clothing either in storage or on display, and when the clothing is removed from the hanger, such as after sale, the hanger is no longer required and is disposed of as rubbish. This is particularly so where clothing is supplied by a wholesaler to the retail outlet on hangers, which is generally the case at least for larger department stores, as the retailer has no need for the hanger once the garment hung thereon has been sold. The hangers are simply collected by the retailer and disposed of as general rubbish. Despite the obvious waste, it is nevertheless a nuisance for either the retailer or the wholesaler to sort the hangers for reuse, particularly when the one retailer might have garments supplied on a wide variety of different hangers. Furthermore, significant transport costs may be incurred in returning the hangers to each wholesaler.

For the above reasons, hangers for retail use have typically been very low cost items, being mainly plastic moulded and of a relatively flimsy nature. Because of their construction, such hangers can bend and buckle if they are used to support weighty garments and in general, these do not reflect positively on the quality of the retail outlet, particularly when the garments are of an expensive nature. Retailers would typically prefer to use better quality hangers. However, rather than maintain their own inventory of quality hangers and themselves invest significant time and labour to separately hang thousands of garments, large retailers will (as already noted) usually require the wholesaler/manufacturer to supply garments with hangers. Cost considerations result in the wholesaler/manufacturer supplying the garments with low quality, disposable hangers.

Disposal of clothing hangers for the foregoing reasons is understandably regarded as wasteful, costly and detrimental to the environment. With increasing effort being made to reduce wastage in industry generally, the disposal of significant numbers of hangers does not reflect well on the retail clothing industry. There is therefore considerable motivation to recycle clothing hangers if this could be done in a cost effective manner. However, recycling of hangers is known to be a cumbersome task, because the hangers need to be sorted into groups of the same kind or style, and if the hangers to be recycled are provided for sorting in a jumbled state, then many of the hangers will be tangled together. The most common entanglement is where the hooks are tangled, which is known as the hangers being "crossed".

There is therefore a need for a simplified operation to decross or separate hangers from a supply of hangers to be sorted and to remove groups of hangers that cannot be decrossed. Accordingly, it is an object of the invention to provide a method and an apparatus for that purpose.

SUMMARY OF THE INVENTION

According to one aspect of the present invention there is provided an apparatus for separating a jumbled collection of articles into a plurality of separate and discrete articles, including:

conveyor means adapted to transport a plurality of the articles in succession along a process path;

separation means adapted to permit the articles to proceed along the process path one at a time;

sensing means adapted to detect when an article is entangled or interconnected with one or more other article; and removal means adapted to remove any such entangled or interconnected articles from the process path.

In a preferred embodiment of the invention the separation means includes barrier means adapted to intermittently restrain and release passage of successive individual articles along the conveyor means process path. Preferably, the barrier means includes a pair of gate members spaced apart along the process path, each of said gate members being moveable between an open and a closed position. A downstream one of said gate members is adapted to restrain an immediately adjacent upstream article and successive following articles from proceeding along the process path when in the closed position. An upstream one of the gate members is adapted to isolate said upstream article immediately adjacent the closed downstream gate member from the other articles when in the closed position, such that the downstream gate member can be opened to release said isolated article. Furthermore, the pair of gate members are spaced apart along the process path a distance sufficient to permit only a single article to fit therebetween, and the upstream gate member is adapted to be opened after the downstream gate member is closed.

In a preferred embodiment of the invention the sensing means is adapted to detect the passage of released articles along the process path beyond the barrier means. Furthermore, the sensor means is adapted to interpret a delay in the passage of a released article along the process path as indicating entanglement of that article with an adjacent following article.

In a preferred embodiment of the invention the removal means includes a bridging device interconnecting two sections of the conveyor means, the bridging device able to be moved to create an opening or gap between the sections of the conveyor means to allow entangled articles to drop out of the process path. Preferably the sensing means is adapted to identify said delayed article and said following article for removal from the process path, the sensing means further adapted to actuate the removal means to remove the identified articles.

Typically, the articles to be separated are clothing or garment hangers and the conveyor means is preferably adapted to engage with a hook of each of the hangers to transport a plurality of the hangers in succession along the process path. Desirably, therefore, the conveyor means includes a screw conveyor upstream of the separation means, with the screw conveyor configured to allow a single hanger hook to fit between adjacent thread portions of the conveyor screw to facilitate arrangement of the hangers in succession.

In at least one exemplary embodiment, therefore, the present invention provides a hanger separating facility that separates a hanger from one end of a line of hangers and releases that hanger for conveyance by conveying means to a hanger sorting facility, while retaining the remaining hangers from release from the hanger line. Conveyance of the separated hanger is retarded if it is crossed with another hanger remaining in the line of hangers and sensing means is provided to sense that retardation and to cause the separating facility to release a predetermined number of hangers from the line of hangers immediately adjacent the retarded hanger, for removal of those hangers prior to the sorting facility.

The apparatus of the invention advantageously removes crossed hangers from the line of hangers, so that those hangers can be sent to be decrossed, and so that the remaining hangers can proceed directly to the sorting facility. Decrossing of the crossed hangers can be by any suitable method or means and the decrossed hangers can be returned to the apparatus of the invention for conveyance to the sorting facility, or they can be sent directly to the sorting facility.

In the apparatus according to the invention, the line of hangers conveniently may be formed by hanging the hangers from their hooks along a suitable elongate support member, which preferably includes means to convey those hangers towards the separating facility. Hanging the hangers by their hooks is convenient for loading the hangers, because invariably all hangers have a hook, regardless of whether the other parts of the hanger vary, as may occur depending on the type of garment the hanger is used for hanging. It is not however, essential that the hangers be hung in this manner.

If the hangers are hung by their hooks over a support member, that member is preferably in the form of a conveyor, so that the hangers can progressively be loaded on to one end of the conveyor and be conveyed to the separating facility. While the conveyor can take any suitable form, such as a belt conveyor, the conveyor more preferably is of the screw or worm type, so that each hanger is separately located between adjacent threads of the conveyor. This has the effect of separating the hangers from each other in a regular manner and can itself cause decrossing between hangers, although it does not necessarily have that effect.

In the alternative to a screw or belt conveyor, the support member could be a rod or rail along which the hangers are supported and other means could be used to convey the supported hangers to the separating facility, such as by an air jet or even by manual pressure. However, an automated system is preferred. Still alternatively, the support member might be an inclined member so that the hangers tend to slide toward the lower end of the member, which can be located adjacent the separating facility, under their own weight. Clearly many other possibilities exist.

The separating facility equally can have a variety of different forms and in a preferred form, it includes a gate that is caused to become interposed between the forwardmost hanger in the line of hangers and the next adjacent hanger, so that the forwardmost hanger can be separated from the remaining hangers for conveyance to the sorting facility. The gate can also have a restraining effect on the remaining hangers so that the separated hanger is available for conveyance to the sorting facility unfettered by those hangers (assuming the hanger is not crossed with one of those hangers). Alternatively retaining means may be provided to retain the hangers behind the group which is released, so that only a certain sized group is released. The retaining means may include a gate that can be interposed into the hanger line, behind the group to be released, upon receiving the appropriate signal from the sensing means. The gate may be moveable from a retracted position spaced from the hangers, to the interposed position as described and that movement may for example, be vertical or horizontal movement.

In a preferred form, the separating facility includes two gates which are spaced apart in the direction of travel of the hangers, a distance sufficient to receive the supported section (generally a hook) of one hanger therebetween. The gates are controlled, so that the trailing gate (in the direction of travel of the hangers) opens to allow a single hanger to move forward into the space between the two gates, and then closes to separate or isolate that hanger from the remaining hangers and to prevent its further movement. The leading gate is then opened to release the separated hanger for conveyance to the sorting facility. The remaining hangers are retained behind the trailing gate until the separated hanger is released, at which time the leading gate is shut and the trailing gate is again opened to receive a further hanger therebetween. The gates can be controlled to open and shut continuously in an automated oscillating process so that a continuous feed of hangers to the sorting facility is provided. Also, the hangers can be banked up behind the separating facility and conveying means of the kind described earlier can be used to supply hangers to the separating facility.

A hanger that is released from the separating facility may be conveyed to the sorting facility in any suitable manner and again, conveying means of the kind described earlier can be used for that purpose. However, when a crossed hanger is released from the separating facility, as may occur if the body or a part of the hook of one hanger is crossed with another, the hanger may be retarded against conveyance to the sorting facility because of that crossing. In those circumstances, the sensing means senses the retardation of the hanger, and in one preferred arrangement, the sensing means detects the increased delay which occurs when a hanger is retarded, between release of the hanger and an arbitrary position in the conveyance of the hanger to the sorting facility. If the conveyance to the sorting facility is by way of a conveyor or conveyors, then the position at which the sensor detects the presence or absence of a hanger can be at some position along the path of one of the conveyors.

In the absence of the detection of a hanger at the nominated arbitrary position after the predetermined time, the sensing means activates the separating facility to release a group of hangers from the hanger line, which group preferably corresponds to a predetermined number of hangers that would be considered to normally include the or each of the hangers to which the first hanger is crossed. For example, the group may consist of the immediately adjacent three or four hangers behind the released hanger if it is considered unlikely that the released hanger could be crossed with a hanger or hangers further back in the hanger line. In most cases, the released hanger, if crossed, will be crossed with the immediately adjacent hanger and no hangers further behind, so releasing a group of three hangers is considered to take care of a substantial portion of any crossed hangers. However, even if the released hanger is crossed with a hanger say five behind, the sensor will cause a second group to be released that will include the relevant hanger after a second predetermined time delay.

The group of crossed hangers that is released can be conveyed to any suitable location for decrossing and in a preferred arrangement, the conveying means can be arranged to remove those hangers before they reach the sorting station. In one arrangement, the conveying means can include a bridging arrangement having a bridging element that bridges an opening between two sections of the conveying means, and when crossed hangers are encountered, the bridging element is removed or withdrawn from the opening to allow the hangers to fall through the opening for collection. The hangers which are removed may fall onto another conveyor, or into a container, or simply fall onto the floor. The movement of the bridging element can be by any suitable means and in one preferred arrangement, actuating means in the form of a hydraulic or pneumatic actuator is employed to retract the bridging element from the bridging the opening.

The separating apparatus may include an arrangement for sorting the hangers received from the separating facility and a second separating facility may be provided to control delivery of the hangers to the sorting arrangement. The second separating facility may be of the same or similar construction to the first separating facility already described, or an alternative construction may be provided. The second separating facility can be arranged to provide hangers at predetermined intervals to be sorted, or to be conveyed to the sorting facility. In one form, a screw or worm conveyor receives hangers from the second separating facility, in a manner that when the conveyor has rotated to a particular rotational position to receive a hanger, the hanger is released from the second separating facility.

Additional sensing means can be provided to the sensing means already described, to sense the presence or absence of hangers at various positions throughout the apparatus of the invention. Those sensing means can be used to regulate the delivery of hangers from the hanger line to maintain a constant flow of hangers through the apparatus. For example, if a group of crossed hangers is removed, then the sensors may speed up the delivery of hangers to compensate for the hangers removed.

The conveying means can take a variety of forms and can simply comprise inclined support railing for example, and/or a motor driven conveyor. Also, assistance may be provided to move the hangers in the conveying direction, such as by air jets or other suitable means.

According to another aspect of the present invention there is provided a method for separating a jumbled collection of articles into a plurality of separate and discrete articles, including the steps of:

conveying a plurality of said articles in succession along a process path;

intermittently restraining and releasing passage of successive individual articles along the process path;

sensing whether or not the passage of a released article is entangled or interconnected with one or more other article; and removing any entangled or interconnected articles from the process path.

In a preferred embodiment, therefore, the invention also provides a method which includes separating a hanger from one end of a line of hangers and releasing that hanger for conveyance to a hanger sorting facility while retaining the remaining hangers from release from the hanger line, sensing the movement of the released hanger and if that movement does not meet predetermined parameters, releasing a group of hangers from the hanger line immediately adjacent the released hanger and removing those hangers prior to the sorting facility.

BRIEF DESCRIPTION OF THE DRAWINGS

The above and further features of the present invention will be more fully appreciated from the following detailed description of preferred embodiments of the invention with reference to the accompanying drawings, in which like characters designate like features, and in which:

FIGS. 3 and 4 show a retractable bridge arrangement for removing entanged hangers from the apparatus of FIG. 1.

DETAILED DESCRIPTION OF PREFERRED EMBODIMENTS

Figure 1:
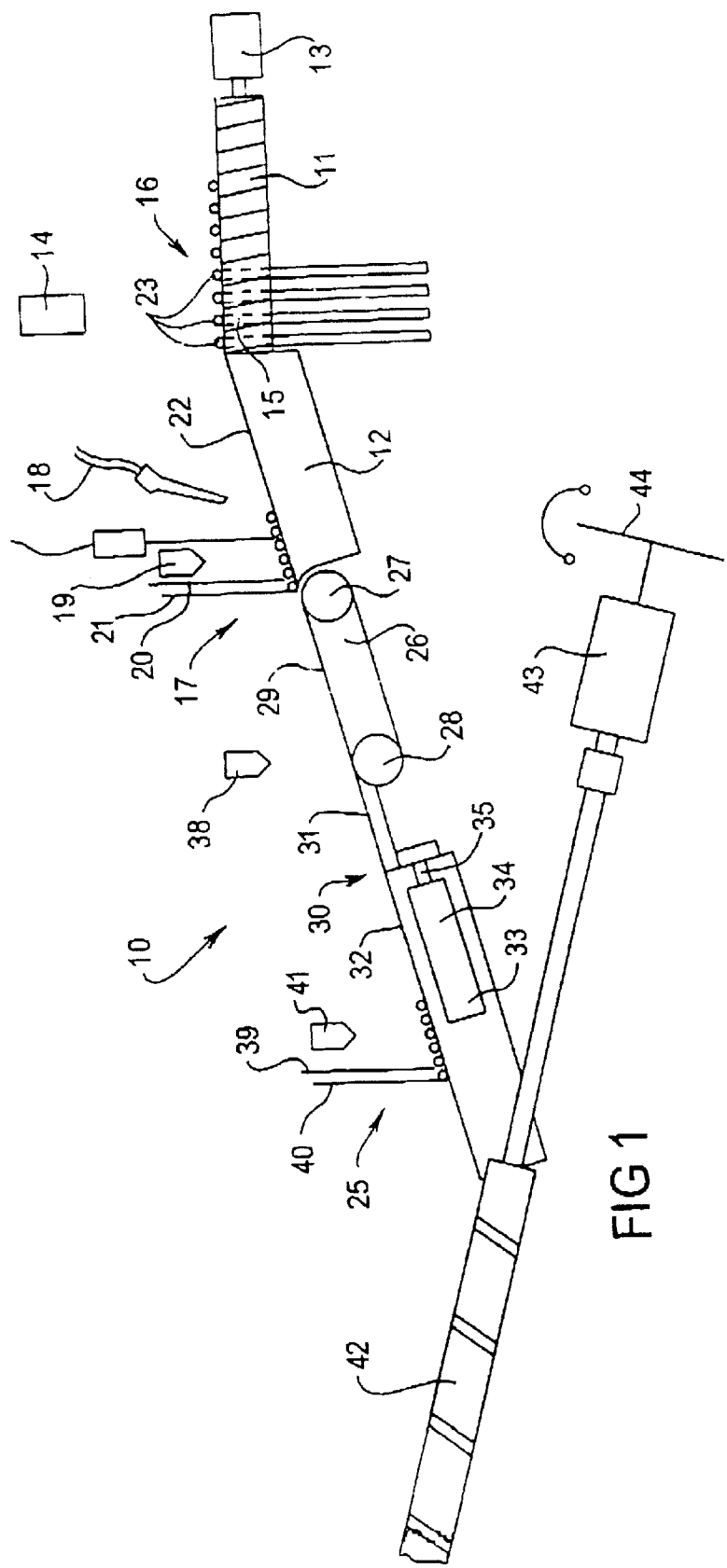
FIG. 1 is a schematic illustration of an apparatus according to a preferred embodiment of the invention.

A separating apparatus according to the invention is shown in FIG. 1. The separating apparatus 10 includes a first conveyor 11 upon which hangers which are to be sorted are placed in a hanging condition. The conveyor 11 can be of any suitable form and is required only to convey hangers hung thereon to move toward an inclined ramp 12. The conveyor 11 is preferably a worm or screw conveyor and has a threaded pitch of a dimension suitable to receive only one hanger hook between adjacent threads. The operator of the machinery can place bundles of hangers on the conveyor 11 without exercising care to ensure that adjacent hangers are decrossed, because, as will become apparent later, the apparatus 10 serves to remove crossed hangers. The operator is therefore relieved of the time consuming and tedious job of carefully separating each hanger in the bundle.

The conveyor 11 is driven by a motor 13, which can be of any suitable form, and the motor is controlled by a first sensor 14 that detects the presence of hangers hung on the conveyor 11 at the end section 15 adjacent the ramp 12. If the first sensor 14 detects no hangers in that end section, then the motor 13 is activated by the sensor to convey hangers towards the ramp 12. Subsequently, when hangers are detected, the sensor 14 shuts the motor off, and this may occur when a predetermined number of hangers have been conveyed to the end section 15. Additionally, the sensor may cause the motor 13 to drive the conveyor 11 faster if, after a predetermined period, no hangers or insufficient hangers have been detected by the sensor 14. This may be necessary if for example, the hangers are being loaded on to the conveyor 11 too slowly.

While the motor 13 has been started to drive the conveyor 11, the sensor 14 alternatively may control a clutch mechanism to which the motor 13 and the conveyor 11 are connected, with the clutch mechanism controlling the conveyor drive. This alternative arrangement illustrates that a variety of possibilities exist for driving and controlling the conveyor 11.

The hangers 16 are conveyed onto the ramp 12, and these hangers 16 travel along the inclined surface of the ramp 12 toward a separating station 17. An air jet 18 acts on the hooks 23 of the hangers 16 in the direction of travel toward the separating station 17 to assist their movement in that direction. A second sensor 19 performs a similar function to the first sensor 14, such that it detects the presence of hangers on the upward side of the ramp 12 adjacent the separating station 17 and if no hangers or insufficient hangers are detected, it activates the motor 13 to convey hangers on to the ramp 12. The sensor 19 is independent from the sensor 14 and the sensor 19 can override the sensor 14 at times when the sensor 14 has shut the motor 13 off because it has sensed hangers at the end section 15 of the conveyor 11. That is, if the sensor 14 has shut the motor 13 off due to the existence of hangers 16 at the end section 15 of the conveyor 11, the sensor 19 can activate the motor 13 independently of the sensor 14 if it detects an absence of hangers or insufficient hangers on the upward side of the ramp 12 adjacent the separating station 17.

Figure 2A:
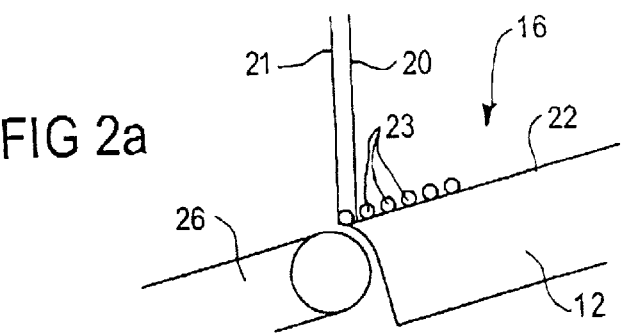
FIGS. 2a to 2d illustrate the operation of gate members for separating hangers in the apparatus of FIG. 1.

The separating station 17 includes a pair of stepper gates 20 and 21 and the operation of these is illustrated in FIGS. 2a to 2d. In FIG. 2a, both stepper gates 20 and 21 are engaged against the upper surface 22 of the ramp 12 in a downward or blocking position, preventing travel of the hangers down the ramp 12 beyond the stepper gates. Actual engagement of the stepper gates with the upper surface 22 may not be necessary, but it is necessary that the stepper gates move close enough to the upper surface 22 so that the hooks 23 of the hangers 16 cannot move past the stepper gates in their downward positions.

Figure 2B:
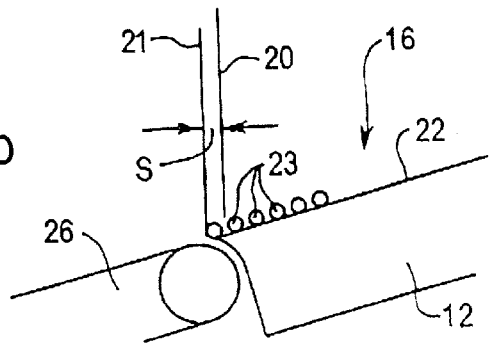

The stepper gates 20 and 21 can move independently, preferably in an oscillating motion, from the downward positions shown in FIG. 2a, to a raised position in which position a hook 23 of a hanger 16 can pass below the respective stepper gate. The stepper gates 20 and 21 are generally raised from the downward position at different times and FIG. 2b illustrates the arrangement in which the stepper gate 20 has been raised, while the stepper gate 21 remains in the downward position. In that figure, raising of the stepper gate 20 facilities travel of the hangers 16 down the inclined surface 22 of the ramp 12, a distance equal to the spacing S between the stepper gates 20 and 21. For the purposes of separating the hangers 16, that spacing S is approximately equal to the diameter of the hooks 23 that travel along the upper surface 22 of the ramp 12 so that a single hook 23 only is received between the stepper gates 20 and 21. Of course the hooks 23 may not be circular, or may vary in cross-section in different parts of the hook and so the spacing S between the stepper gates 20 and 21 should take account of these potential variations in hook configuration and preferably the spacing S is adjustable.

Figure 2C:
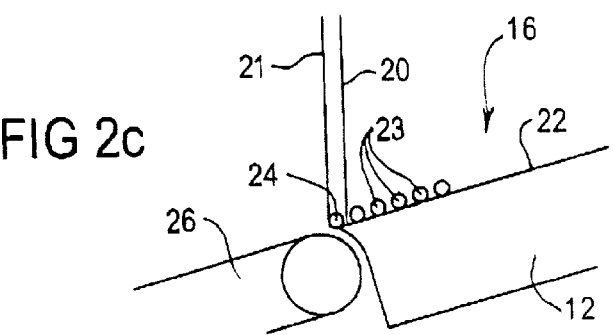
Figure 2D:
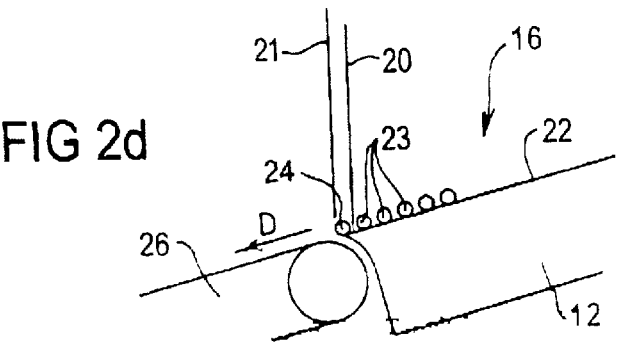

In FIG. 2c, the stepper gate 20 has been returned from its raised position of FIG. 2b, to the downward position of FIG. 2a and the hook 24 of a hanger 16 is captured between the stepper gates 20 and 21. The stepper gate 21 is now raised from the downward position to the raised position shown in FIG. 2d. The hook 24 and the hanger body which is attached thereto, is now free to travel further down the ramp 12 in the direction D, toward a second separating station 25, and is immediately picked up by a conveyor 26 to promote that travel. The remaining hangers are maintained behind the stepper gate 20, until it is again raised to separate a further hanger from the hanger line.

The conveyor 26 includes a pair of wheels 27 and 28 about which a conveyor belt 29 runs and the wheel 28 is positioned adjacent a bridging arrangement 30, which is shown in more detail in FIGS. 3 and 4. In those figures, the bridging arrangement includes a movable bridging element 31, which is connected in any suitable manner to an inclined ramp 32. The ramp 32 can be of a different construction to the ramp 12, although the angle of inclination is preferably the same. The ramp 32 can be tubular or channel shaped, such as U or L shaped, to accommodate a hydraulic or pneumatic actuator 33 having a cylinder 34 and a ram 35. Connected to the ram 35 is a head 36, to which the bridging element 31 is attached.

The ram 35 is normally in the extended condition as shown in FIGS. 1 and 3, in which the distal end 37 of the bridging element 31 is adjacent to the wheel 28 of the conveyor 26, so that hangers conveyed along the conveyor 26 are supported on and travel along the bridging element 31 to the ramp 32. However, the ram 35 can be retracted so that its distal end is spaced away from the wheel 28 and thereby opening a gap between the conveyor 26 and the ramp 32 through which the hangers can fall. This arrangement is provided for the purpose of preventing crossed hangers from progressing to the second separating station 25. The ability of the sorting apparatus 10 to remove crossed hangers will be explained in relation to FIGS. 1 and 5.

Figure 5:
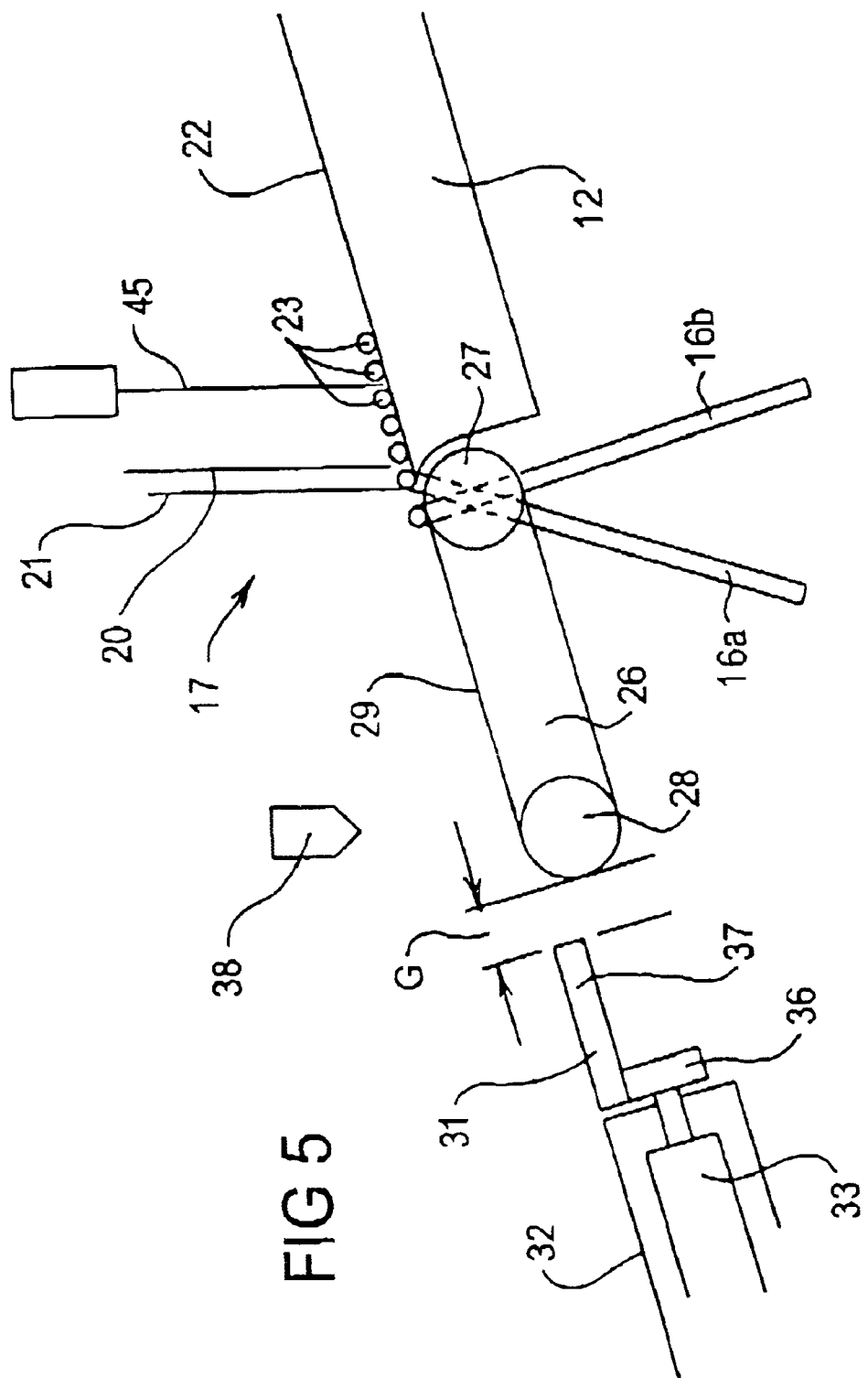
FIG. 5 illustrates the operation of the apparatus in FIG. 1 in the event of crossed hangers.

FIG. 5 illustrates the bridging element 31 in the retracted position, that exposes a gap G between the end of the conveyor 26 at the wheel 28 and the distal end 37 of the bridging element 31. The hangers 16a and 16b shown in full (schematic drawings only) are crossed. The hanger 16a has passed through the first separating station 17 and has moved onto the conveyor 26 which will convey it toward the ramp 32. However, the hanger 16a is crossed with the hanger 16b, so that movement of the hanger 16a is retarded until such time as the hanger 16b also passes through the separating station 17. Therefore, there is a delay in movement of the hanger 16a toward the ramp 32 That delay is detected by a sensor 38 that expects to detect a hanger moving toward the ramp 32 within a predetermined period of time after it is released from the separating station 17, and when that detection is not made, the assumption is made that the hangers are crossed. In response, the sensor 45 causes the actuator 33 to withdraw the ram 35, so as to create the gap G between the conveyor 26 and the bridging element 31. In the illustrated arrangement of FIG. 5, the hanger 16b will be released from the separating station 17 in the normal manner and both of the hangers 16a and 16b will be conveyed together in their crossed state toward the ramp 32. However, the actuator 33 will withdraw the ram 35 to coincide with arrival of crossed hangers 16a and 16b so that they will fall through the gap G and will not proceed to the ramp 32.

When a crossed hanger is detected, a barrier plate 45 is introduced into the hooks 23 on the upside of the separating station 17 and that enables the stepper gates 20 and 21 either to continue oscillating or to both be raised away from the upper surface 22 without permitting further hangers to pass onto the conveyor 26. This prevents further passage of hangers through the separating facility 17 while the gap is exposed. In an alternative arrangement, the stepper gates 20 and 21 could be prevented from oscillating to achieve the same result.

The crossed hangers that have fallen through the gap G can be collected and decrossed by any suitable means, such as by hand, and then be replaced on the first conveyor 11 as previously described. The arrangement so far described thus eliminates crossed hangers from proceeding to the sorting facility and thereby prevents the crossed hangers from disrupting the sorting operation.

Hangers that are not crossed proceed to the ramp 32 over the bridging element 31 and are processed by the second separating station 25. That station also includes a pair of stepper plates 39 and 40 that oscillate in the same manner as the earlier described stepper plates 20 and 21. The separating station 25 also includes a sensor 41 that detects the presence of hangers on the upside of the ramp 32 adjacent the station 25 and in the event that too many hangers are detected in that region, the sensor 41 controls any one of the motor 13, the barrier plate 38, or the stepper gates 20 and 21, to slow down or temporarily stop the progression of hangers to the station 25. Once a reduced number of hangers is detected, then the progression of hangers can recommence. If too few hangers are detected, then the sensor 41 can initiate further supply.

In operation, the stepper gates 20 and 21 operate faster than the stepper gates 39 and 40 to compensate for crossed hangers that are removed. The difference in speed can be in the order of 10 to 15%. The difference in operating speed can be altered as necessary.

The stepper gates 39, 40 release the hangers to a conveyor 42, that may be of any suitable form, but is preferably a screw conveyor as shown. The stepper gates 39 and 40 operate in register with the screw conveyor, so that when the conveyor 42 is in a position to receive the hook of a hanger, a hanger is released from the upside of the separating station 25 whereafter it is conveyed by the conveyor 42 to another location where the hangers are sorted into bundles of the same style. The conveyor 42 is driven by a motor 43 and an encoder 44 communicates with the separating station 25 to maintain the conveyor and the release of hangers in register.

The separating apparatus according to the invention facilitates the removal of crossed hangers from a group of hangers to be sorted and eliminates or at least reduces the manual labour associated with decrossing hangers. With the apparatus described, crossed hangers may become decrossed as a result for example of being placed onto the conveyor 11, or as a result of passing through the separating facility 17, or as a result of falling through the gap G. Hangers that fall through the gap G can be collected and returned to the conveyor 11 and can be repeatably passed through the separating apparatus until they are decrossed, or alternatively, those crossed hangers that are collected may be decrossed manually and sent directly to the sorting facility, or can be placed again through the apparatus so that they are transferred to the screw conveyor 42.

Many modifications can be made to the apparatus 10 as described. The manner in which the sensors control the separating stations and the actuator 33 could easily be modified and still achieve the same function. Equally, the opening of a gap G through which crossed hangers can fall could also be changed to a different arrangement, such as an arrangement to remove the hangers by lifting them away, or by conveying them elsewhere. A variety of different options exist.

The invention described herein is susceptible to variations, modifications and/or additions other than those specifically described and it is to be understood that the invention includes all such variations, modifications and/or additions which fall within the spirit and scope of the above description.

What is claimed is:

1. An apparatus for separating a jumbled collection of articles into a plurality of separate and discrete articles, including:

conveyor means adapted to transport a plurality of said articles in succession along a process path;

separation means adapted to permit said articles to proceed along the process path one at a time;

sensing means adapted to detect when an article is entangled or interconnected with one or more other articles; and removal means adapted to remove any such entangled or interconnected articles from the process path.

2. An apparatus as claimed in claim 1 wherein the conveyor means includes any one or more of: a screw conveyor, a belt conveyor and a slide conveyor; said slide conveyor optionally including pusher means for assisting sliding movement of the articles there-along.

3. An apparatus as claimed in claim 2 wherein the pusher means includes an air jet to be directed at the articles or, alternatively, a pushing member for contact with the articles, said pushing member itself adapted for movement in a direction of the process path.

4. An apparatus as claimed in claim 1 wherein the removal means includes a bridging device interconnecting two sections of the conveyor means the bridging device able to be moved to create an opening or gap between the sections of the conveyor means to allow entangled articles to drop out of the process path.

5. An apparatus as claimed in claim 4 wherein the bridging device includes a moveable bridging element which is automatically actuable, for example by a hydraulic or pneumatic actuator, by a control signal from the sensing means.

6. An apparatus as claimed in claim 1 wherein the articles to be separated are clothing or garment hangers and wherein the conveyor means is adapted to engage with a hook of each of the hangers to transport a plurality of said hangers in succession along the process path.

7. An apparatus as claimed in claim 6 wherein the conveyor means includes a screw conveyor upstream of the separation means, said screw conveyor configured to allow a single hanger hook to fit between adjacent thread portions of the conveyor screw to facilitate arrangement of the hangers in succession.

8. A recycling installation for recycling used garment or clothing hangers including a separating apparatus as claimed in claim 7 in combination with a sorting apparatus for sorting the separated and discrete hangers from the separating apparatus into groups of the same style or type.

9. An apparatus as claimed in claim 1 wherein the separation means includes barrier means adapted to intermittently restrain and release passage of successive individual articles along the conveyor means process path.

10. An apparatus as claimed in claim 4 wherein the barrier means includes a pair of gate members spaced apart along the process path, each of said gate members moveable between an open and a closed position, a downstream one of said gate members adapted to restrain an immediately adjacent upstream article and successive following articles from proceeding along the process path when in the closed position, and an upstream one of the gate members adapted to isolate said upstream article immediately adjacent the closed downstream gate member from the other articles when in the closed position, such that the downstream gate member can be opened to release said isolated article.

11. An apparatus as claimed in claim 9 wherein the sensing means is adapted to detect the passage of released articles along the process path beyond the barrier means, the sensor means being adapted to interpret a delay in the passage of a released article along the process path as indicating entanglement of that article with an adjacent following article.

12. An apparatus as claimed in claim 11 wherein the sensing means is adapted to identify said delayed article and said following article for removal from the process path, the sensing means further adapted to actuate the removal means to remove the identified articles.

13. An apparatus as claimed in claim 12 wherein the pair of gate members are spaced apart along the process path a distance sufficient to permit only a single article to fit therebetween, and wherein the upstream gate member is adapted to be opened after the downstream gate member is closed.

14. A method for separating a jumbled collection of articles into a plurality of separate and discrete articles, including the steps of:

conveying a plurality of said articles in succession along a process path;

intermittently restraining and releasing passage of successive individual articles along the process path;

sensing whether or not the passage of a released article is entangled or interconnected with one or more other article; and removing any entangled or interconnected articles from the process path.

* * * * *